(12) United States Patent
Coppola et al.

(10) Patent No.: US 11,689,074 B2
(45) Date of Patent: Jun. 27, 2023

(54) ROTARY ELECTRIC MACHINE WITH ADHESIVE-REINFORCED ROTOR

(71) Applicant: GM GLOBAL TECHNOLOGY OPERATIONS LLC, Detroit, MI (US)

(72) Inventors: Anthony M. Coppola, Rochester Hills, MI (US); Kestutis A. Sonta, Troy, MI (US); Alireza Fatemi, Canton, MI (US); Gayatri V. Dadheech, Bloomfield Hills, MI (US); Yew Sum Leong, Northville, MI (US); Xiaosong Huang, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 400 days.

(21) Appl. No.: 17/084,181

(22) Filed: Oct. 29, 2020

(65) Prior Publication Data
US 2022/0140680 A1 May 5, 2022

(51) Int. Cl.
*H02K 1/28* (2006.01)
*B60K 1/00* (2006.01)
*H02K 1/27* (2022.01)
*H02K 1/32* (2006.01)
*H02K 15/03* (2006.01)
*H02K 21/14* (2006.01)
*H02K 1/276* (2022.01)

(52) U.S. Cl.
CPC .............. *H02K 1/28* (2013.01); *B60K 1/00* (2013.01); *H02K 1/276* (2013.01); *H02K 1/32* (2013.01); *H02K 15/03* (2013.01); *H02K 21/14* (2013.01); *B60K 2001/006* (2013.01)

(58) Field of Classification Search
CPC .... B60K 1/00; B60K 11/02; B60K 2001/006; H02K 1/246; H02K 1/276; H02K 1/28; H02K 1/32; H02K 15/03; H02K 21/14; H02K 2213/03
USPC ........................................................ 310/61
See application file for complete search history.

(56) References Cited

U.S. PATENT DOCUMENTS 3,681,628 A * 8/1972 Krastchew ............... H02K 9/00
310/52
5,285,699 A * 2/1994 Walls .................. B29C 66/5221
74/572.12
6,144,130 A * 11/2000 Kawamura ............ H02K 1/278
310/264
6,229,243 B1 * 5/2001 Roesel, Jr. ............. H02K 1/278
310/216.116

(Continued)

*Primary Examiner* — Alex W Mok
(74) *Attorney, Agent, or Firm* — Quinn IP Law (57) ABSTRACT

An adhesive-reinforced rotor for a rotary electric machine includes rotor lamination layers ("rotor lams") having axial inner surfaces collectively defining rotor openings through the rotor lams. The rotor also includes reinforcement blocks disposed within a respective one of the rotor openings. A polymer primer/adhesive layer of the rotor having a bond line thickness of less than 1 mm is disposed between the one or more reinforcement blocks and the axial inner surfaces of the rotor lams. The reinforcement blocks and the primer/adhesive layer each have a tensile strength of at least 50 MPa. A modulus of elasticity of the reinforcement blocks is at least three times greater than that of the materials of the polymer primer/adhesive layer. A method of constructing an adhesive-reinforced rotor is also described herein.

20 Claims, 7 Drawing Sheets

(56) References Cited

U.S. PATENT DOCUMENTS

| | | | | |
|---|---|---|---|---|
| 6,486,575 B2* | 11/2002 | Miller | | B29C 70/02 |
| | | | | 310/43 |
| 6,509,667 B1* | 1/2003 | El-Antably | | H02K 15/02 |
| | | | | 310/43 |
| 6,700,242 B2* | 3/2004 | Kawamura | | H02K 11/0094 |
| | | | | 310/191 |
| 7,122,932 B2* | 10/2006 | Narayanan | | H02K 17/16 |
| | | | | 310/262 |
| 7,800,276 B2* | 9/2010 | Purvines | | H02K 21/12 |
| | | | | 310/156.01 |
| 7,981,359 B2* | 7/2011 | Masuzawa | | H02K 1/2766 |
| | | | | 29/598 |
| 9,729,025 B2* | 8/2017 | Hull | | H02K 7/02 |
| 2004/0201301 A1* | 10/2004 | Regan | | H02K 1/246 |
| | | | | 310/156.53 |
| 2006/0066168 A1* | 3/2006 | Shoykhet | | H02K 17/16 |
| | | | | 310/211 |
| 2006/0170301 A1* | 8/2006 | Masuzawa | | H02K 1/276 |
| | | | | 310/156.53 |
| 2016/0376709 A1* | 12/2016 | Galos | | C25D 5/022 |
| | | | | 428/457 |
| 2019/0199151 A1* | 6/2019 | Loder | | C25D 5/10 |
| 2020/0195071 A1 | 6/2020 | Fatemi et al. | | |

\* cited by examiner

ROTARY ELECTRIC MACHINE WITH ADHESIVE-REINFORCED ROTOR

INTRODUCTION

A rotary electric machine of the type used in an electric drive system operates in a motoring or torque generating mode in which output torque is delivered to a coupled load, e.g., one or more road wheels of a motor vehicle, or a generating mode in which machine rotation is used to generate electricity. In a typical configuration, the electric machine includes a cylindrical rotor formed from a stack of thin magnetic rotor lamination layers or "lams". The magnetic material of a rotor lam is typically an alloy of iron and silicon generally referred to in the art as electrical steel. In operation, the rotor and an integrally-connected rotor shaft rotate in unison when field windings of an accompanying stator are sequentially energized by a high-voltage power supply, with the power supply typically including a multi-cell high-voltage traction battery pack and a power inverter.

As the rotational speed of an electric machine increases, so too does the machine's power density. However, higher-speed rotation increases mechanical stress on the crystalline structure of the rotor lams, with stress concentrations being prevalent in closer proximity to slots, web regions, and other rotor openings in the rotor lams. In order to prevent stress-related degradation of the rotor lams, therefore, a manufacturer may attempt to bolster or reinforce the rotor lams with additional electrical steel. However, the added material may reduce the electric machine's operating efficiency and overall torque/speed performance.

SUMMARY

Disclosed herein are rotary electric machines and adhesive-reinforced rotors for the same, along with associated methods for manufacturing or assembling such rotors. Rotor stress concentrations around rotor openings defined by a stack of rotor lamination layers ("rotor lams") are a limiting factor in high-speed operating modes. It is recognized herein that certain types of bonded-in reinforcement structure are able to operate at higher angular speeds relative to electrical steel and other types of magnetic core materials used to construct the individual rotor lams. The disclosed construction therefore adhesively bonds reinforcement blocks to the rotor lams around an inner periphery of at least some of the rotor openings to substantially fill the rotor openings. This construction has the desirable effect of reducing the above-noted stress concentrations in surrounding regions of the rotor lams. Additionally, the presence of the reinforcement blocks helps reduce or eliminate thin magnetic bridges of the rotor lams in web regions of the rotor lams/rotor stack to improve the electric machine's operating efficiency and performance, for example by reducing undesirable flux leakage/magnetic short-circuiting while providing useful mechanical support.

More specifically, structural and magnetic performance advantages are enabled herein by filling defined voids of at least some rotor openings with non-magnetic, non-metallic, electrically non-conductive reinforcement blocks, e.g., ceramic blocks or blocks of a reinforced polymer material. The latter material may be formed and cured to construct the above-noted reinforcement blocks, with such construction occurring either inside of the rotor lams or separately therefrom in different embodiments. The present approach also incorporates a thin layer of polymer material between interfacing surfaces of the rotor lams, i.e., the inner peripheral surfaces of the rotor openings, and the reinforcement blocks formed or provided therein, and/or interfacing surfaces of the rotor lams and optional permanent magnets disposed within the rotor openings.

In the various embodiments set forth herein, the polymer material used to bond the reinforcements blocks to the rotor lams is configured to act as both a primer material and an adhesive material to enhance the rotor's high-speed operating performance. Accordingly, a physical layer formed from such material is referred to herein as a polymer primer/adhesive layer. The polymer primer/adhesive layer acts primarily as an adhesive material when applied in smaller rotor openings or gaps in the rotor lams, and primarily as a primer material when applied in larger rotor openings or gaps, with various use cases described in detail below.

In a particular embodiment, an adhesive-reinforced rotor for a rotary electric machine includes a stack of rotor lamination layers ("rotor lams") constructed of a magnetic core material, each of the rotor lams having inner axial surfaces collectively defining a set of rotor openings through the magnetic core material. One or more reinforcement blocks constructed of a non-magnetic, non-magnetic, and electrically non-conductive material are disposed within a respective one of the rotor openings. A polymer primer/adhesive layer having a bond line thickness of less than 1 mm is disposed between the one or more reinforcement blocks and the inner axial surfaces of the rotor lams. In this embodiment, the polymer primer/adhesive layer and the reinforcement blocks have a tensile strength of at least 50 MPa, and a modulus of elasticity of the reinforcement blocks is at least three times greater than a modulus of elasticity of the primer/adhesive layer.

A modulus of elasticity of the reinforcement blocks may be at least 10 GPa, while the modulus of elasticity of the polymer primer/adhesive layer is less than 3 GPa. In some configurations in which the reinforcement blocks is constructed from a reinforced polymer, at least 30% of a volume of the reinforcement blocks is made up of reinforcement fibers and/or particles, while less than 10% of a volume of the polymer primer/adhesive layer is made up of the reinforcement fibers and/or particles.

The reinforcement blocks may be optionally constructed of a ceramic material in other embodiments.

In some embodiments, the polymer primer/adhesive layer has a bond line thickness of between 0.05 mm and 0.2 mm, a modulus of elasticity of less than 1 GPa, and a coefficient of linear expansion of at least 40 ppm/° C.

The rotor may include permanent magnets, each respective one of which is disposed within a corresponding one of the rotor openings and bonded to the rotor lams by the polymer primer/adhesive layer.

At least one of the reinforcement blocks may optionally define one or more coolant channels therethrough.

In some configurations, the polymer primer/adhesive layer includes a void volume of between 0.5% and 5% of a total volume of the primer/adhesive layer.

At least one of the reinforcement blocks may include multiple sections bonded together using the polymer material of the polymer primer/adhesive layer.

Aspects of the present disclosure include a thin nucleation layer deposited on or along the axially-extending inner surfaces of the rotor lams, i.e., perimeter surfaces of the rotor openings, to a thickness of 20 nm or less.

An outer surface of the reinforcement block may optionally define protuberances each having a height of between 95% and 99% of the bond line thickness.

A method of constructing the above-noted adhesive-reinforced rotor for a rotary electric machine is also disclosed. In an exemplary embodiment, the method includes forming a stack of rotor lams from a magnetic core material, the rotor lams including axial inner surfaces that collectively define a set of rotor openings through the rotor lams. The method includes coating the axial inner surfaces of the rotor lams with the polymer primer/adhesive layer to a predetermined bond line thickness of less than 1 mm, as well as partially curing or b-staging the polymer primer/adhesive layer.

The method in this embodiment also includes inserting reinforcement blocks constructed of ceramic or a reinforced polymer composite material into one or more of the rotor openings after partially curing or b-staging the polymer primer/adhesive material. A modulus of elasticity of the reinforcement blocks is at least three times greater than a modulus of elasticity of the polymer primer/adhesive material. The method includes bonding the reinforcement blocks to the rotor lams around axial inner surfaces using the polymer primer/adhesive material to thereby reinforce the rotor.

In yet another aspect of the present disclosure, a rotary electric machine includes a rotor having rotor lams surrounded by a stator, with the rotor lams being formed of electrical steel and having axial inner surfaces collectively defining a set of rotor openings. The electric machine includes one or more reinforcement blocks constructed of a ceramic material or a reinforced polymer composite material and disposed within the rotor openings, wherein a respective outer surface of each of the reinforcement blocks defines multiple protuberances, and a nucleation layer bonded to the axial inner surfaces. The nucleation layer is constructed of $Al_2O_3$ and has a thickness of less than 20 nm in this particular embodiment. A polymer primer/adhesive layer having a bond line thickness of between 0.05 mm and 0.2 mm is disposed between each respective one of the reinforcement blocks and the rotor lams. The protuberances extend into the primer/adhesive layer a distance of between 90% and 99% of the bond line thickness.

In this exemplary embodiment, a modulus of elasticity of the reinforced polymer material is at least 10 GPa, and a modulus of elasticity of the polymer primer/adhesive layer is less than 1 GPa. The polymer primer/adhesive layer and the reinforcement blocks have a tensile strength of at least 50 MPa and a coefficient of linear expansion of about 10-20 ppm/° C. or more.

The above summary does not represent every embodiment or every aspect of this disclosure. The above-noted features and advantages of the present disclosure, as well as other possible features and advantages, will be readily apparent from the following detailed description of the embodiments and best modes for carrying out the disclosure when taken in connection with the accompanying drawings and appended claims. Moreover, this disclosure expressly includes combinations and sub-combinations of the elements and features presented above and below.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Figures 1, 2C:
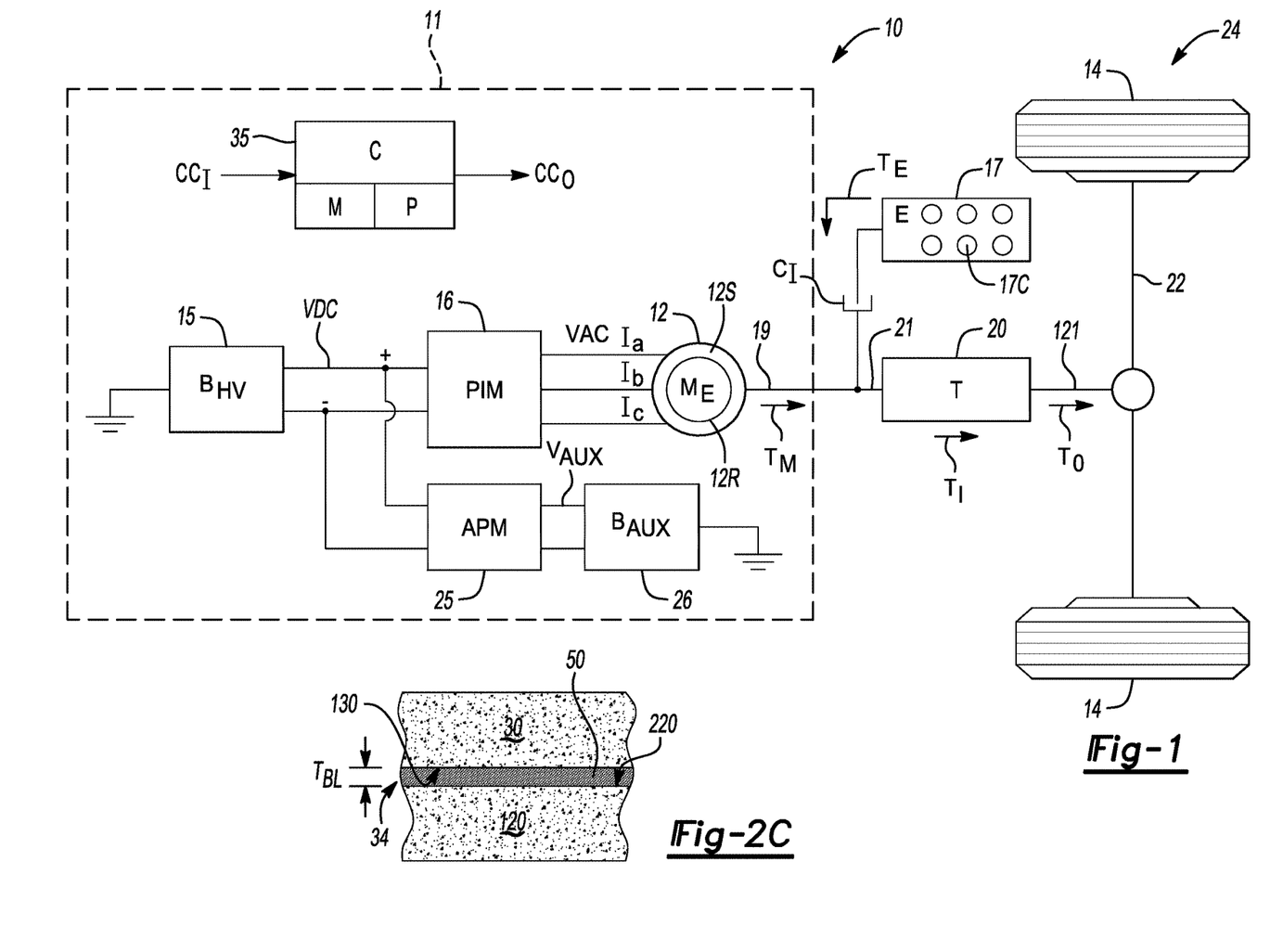
FIG. 1 is a schematic illustration of an exemplary motor vehicle having an electric drive system inclusive of a rotary electric machine, with the electric machine having an adhesive-reinforced rotor constructed as set forth herein.
FIGS. 2A, 2B, and 2C are schematic plan view illustrations of a representative magnetic pole portion of an adhesive-reinforced rotor that is usable as part of the electric machine shown in FIG. 1.

Referring to the drawings, wherein like reference numbers refer to like components, FIG. 1 schematically depicts a motor vehicle 10 having an electric drive system 11, the latter of which includes a rotary electric machine (ME) 12 in the form of a motor/generator unit. As described in detail below with reference to FIGS. 2A-7, the electric machine 12 includes a rotor 12R that is reinforced and assembled in accordance with the present disclosure. The described rotor 12R and the various methods 100, 200, and 300 used in its construction may benefit various types of wheeled and/or tracked land vehicles, propeller-driven watercraft and aircraft, mobile work platforms, etc. Non-vehicular systems may likewise benefit from the present teachings, including for instance electrified powertrain architectures, powerplants, mobile platforms, robots, hoisting or conveying equipment, and the like. The motor vehicle 10 shown in FIG. 1 is therefore illustrative of just one possible beneficial application.

The electric drive system 11 includes the rotary electric machine 12, the operation of which is regulated and controlled in real time by control signals (arrow $CC_O$) from an onboard controller (C) 50. Those skilled in the art will appreciate that motor controllers such as the schematically-represented controller 35 of FIG. 1 respond to input signals (arrow $CC_I$), e.g., driver pedal request, temperature and angular speed of the electric machine 12, etc., by generating and transmitting the control signals (arrow $CC_O$) to one or more relevant subsystems within the electric drive system 11.

Instructions for controlling the electric machine 12 may be recorded in memory (M) and executed by one or more processors (P) in real-time in response to the input signals (arrow $CC_I$). Although omitted for simplicity, the controller 35 may include one or more electronic control modules, units, processors, and associated hardware components thereof, and would be equipped with sufficient tangible and non-tangible variants of the memory (M), Application Specific Integrated Circuits (ASICs), systems-on-a-chip (SoCs), input/output circuitry, high-speed clocks or oscillators, and other hardware and software as needed to provide a desired functionality.

The electric machine 12 of FIG. 1 also includes a stator 12S. As appreciated in the art, the stator 12S may include slots that are wound or filled with conductive stator windings (not shown), such that when energized, interaction between the stator 12S and the rotor 12R causes rotation of the rotor 12R. The rotor 12R is coupled via an output member 19 to one or more road wheels 14 disposed on a drive axle 22. In the depicted optional hybrid embodiment of the motor vehicle 10, an internal combustion engine (E) 17 having multiple combustion cylinders 17C delivers engine torque (arrow $T_E$) through an input clutch $C_I$ to an input member 21 of a transmission (T) 20, e.g., a multi-speed gearbox, with the engine 17 being omitted in other embodiments, such as when the motor vehicle 10 is configured as a battery electric vehicle.

In the depicted hybrid embodiment, motor torque (arrow $T_M$) from the electric machine 12 is delivered to the input member 21 alone or in conjunction with the engine torque (arrow $T_E$) supplied by the engine 17. In other embodiments, the electric machine 12 alone powers the transmission 20, i.e., the motor torque (arrow $T_M$) alone provides the input torque (arrow $T_I$), or the electric machine 12 may be coupled directly to one or more of the road wheels 14 to act as a wheel motor (not shown). In the illustrated exemplary embodiment, the output torque (arrow $T_O$) is directed by an output member 121 of the transmission 20 to the road wheels 14 via the drive axle(s) 22 to propel the motor vehicle 10.

The electric machine 12 is depicted schematically in FIG. 1 with the stator 12S coaxially arranged with respect to the rotor 12R in a typical radial flux configuration, with the present teachings also being extendable to axial flux configurations. The electric machine 12 may be configured as a polyphase/alternating current (AC) traction or propulsion motor in some embodiments. When so constructed, the electric drive system 11 may include a high-voltage traction battery pack (BO 15, e.g., a multi-cell rechargeable lithium-ion construction or another suitable high-voltage/high-power battery chemistry. While the term "high-voltage" is relative to typical 12-15V auxiliary voltage levels, and thus may entail voltage levels anywhere in excess thereof, exemplary battery electrified propulsion applications of the type contemplated herein may require the battery pack 15 to have a voltage capability of 300-500V or more.

Still referring to FIG. 1, the battery pack 15 may be electrically connected to a power inverter module (PIM) 16 via a high-voltage direct current voltage bus (VDC), with the PIM 16 in turn electrically connected to the stator 12S via a high-voltage AC voltage bus (VAC). Although omitted for illustrative simplicity, the PIM 16 is internally configured and externally controlled via ON/OFF state control of multiple dies of semiconductor switches, with such switches typically embodied as IGBTs or MOSFETs. Thus, a DC input voltage to the PIM 16 is inverted and controlled to ultimately deliver an AC output voltage and corresponding phase currents (Ia, Ib, Ic) by high-speed pulse width modulation or other suitable switching operations of the PIM 16. During a regenerating event such as braking, the PIM 16 may operate in the opposite manner, i.e., by converting an AC input voltage into a DC output voltage suitable for recharging constituent battery cells of the battery pack 15.

Other components may be connected to the electric drive system 11 shown in FIG. 1, such as but not limited to the illustrated DC-DC converter/auxiliary power module (APM) 25 and a lead-acid or other type of auxiliary battery ($B_{AUX}$) 26 operating at a lower auxiliary voltage ($V_{AUX}$). As noted above, auxiliary voltage levels are typically 12-15V, and therefore the APM 25 may operate through internal switching operations and signal filtering, as is well understood in the art, to receive a relatively high DC voltage from the DC voltage bus (VDC) and output the auxiliary voltage ($V_{AUX}$) to the auxiliary battery 26. The electric machine 12 is therefore just one of multiple devices requiring the reliable and sustained provision of electrical energy from the battery pack 15 during ongoing propulsion operations of the motor vehicle 10.

Figure 2A:
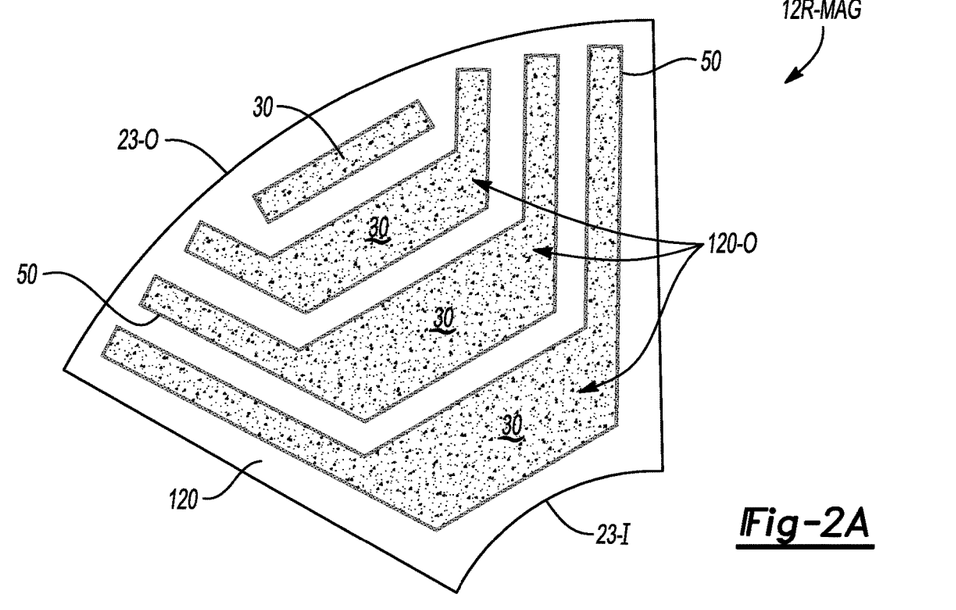
Figure 2B:
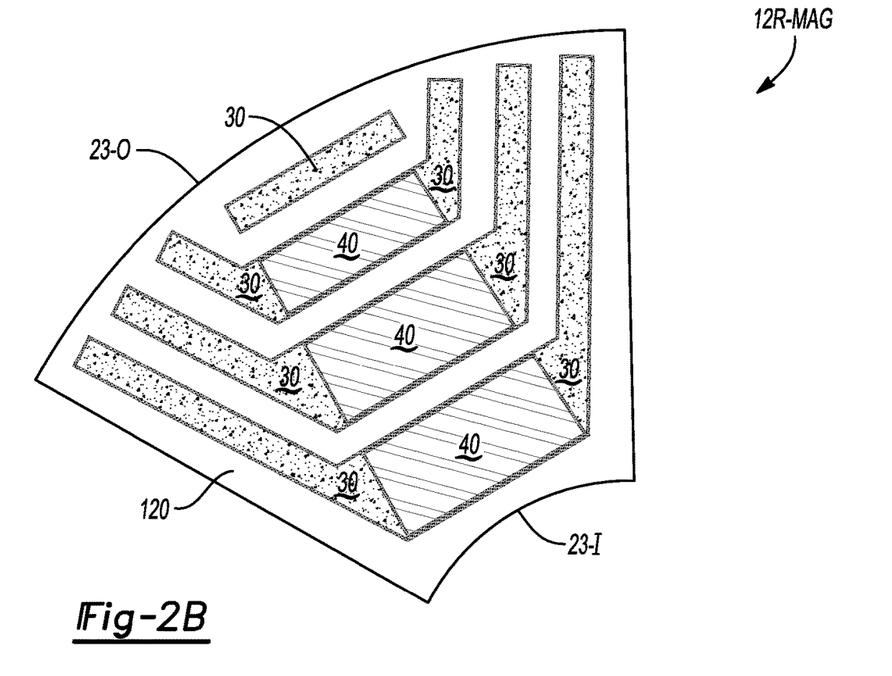

Referring now to FIGS. 2A and 2B, a schematic plan view illustration is provided of a representative magnetic pole section 12R-MAG of the rotor 12R shown in FIG. 1, with the magnetic pole section 12R-MAG including a stack of rotor lams 120, one of which is visible from the perspective of FIGS. 2A and 2B. The rotor lams 120 define one or more rotor openings 120-O. As appreciated in the art, such magnetic pole sections 12R-MAG repeat around the full circumference of the annular rotor lams 120, with a number of such magnetic pole sections 12R-MAG in a given construction of the rotor 12R thus being equal to the number of magnetic poles of the rotor 12R. The exemplary magnetic pole section 12R-MAG is depicted with a non-limiting representative size and internal configuration, in this instance as one of six magnetic pole sections 12R-MAG in a 6-pole construction of the rotor 12R of FIG. 1 defining four rotor openings 120-O per magnetic pole section 12R-MAG. In other words, the rotor 12R may have fewer or more magnetic pole sections 12R-MAG in various embodiments, with or without the depicted number, shape, and orientation of the rotor openings 120-O.

Each fully-formed rotor lam 120 defines a closed annulus or ring having an outer diameter surface 23-O and an inner diameter surface 23-I, as appreciated in the art, and therefore a given magnetic pole section 12R-MAG extends radially between the respective outer and inner diameter surfaces 23-O and 23-I. When fully assembled, the rotor 12R and its constituent axially-extending stack of rotor lams 120 forms a cylindrical hub. A rotor shaft (not shown) may be splined or otherwise joined to the inner diameter surfaces 23-I of the stack rotor lams 120 and coupled to a load 24, e.g., the output member 19, transmission 20, and/or axles 22 as shown in FIG. 1.

Each of the rotor lams 120 may be individually stamped from a thin blank of electrical steel or another application-suitable magnetic or ferromagnetic core material. In a reluctance embodiment (FIG. 2A) or a permanent magnet-assisted embodiment (FIG. 2A), the rotor lams 120 may individually and/or collectively define one or more of the above-noted rotor openings 120-O, with the example embodiment of FIG. 2B possibly providing certain magnetic performance advantages via inclusion of permanent magnets 40, albeit at the expense of additional components.

In the presently disclosed constructions, at least some of the rotor openings 120-O are substantially occupied by or filled with a solid or semi-solid reinforcement block 30 constructed of various possible non-metallic, non-conductive, non-magnetic materials as set forth herein, and possibly a permanent magnet 40 in certain configurations. The composition of such permanent magnets 40 may vary with the intended application, with suitable exemplary non-limiting compositions including ferrite, neodymium (NdFeB), Samarium-cobalt (SmCo), iron nitride or manganese-based magnets, etc.

Likewise, the shape, size, contour, and number of the permanent magnets 40 occupying a given one of the rotor openings 120-O may vary in different embodiments. For ease of manufacture, for instance, and for simplified assembly and/or increased costs savings, it may be desirable that the permanent magnets 40 or a portion thereof have a generally rectangular polyhedron shape. Alternatively within the scope of the present disclosure, the permanent magnets 40 may be polyhedral block-type magnets, V-shaped or U-shaped magnets, ring-shaped/annular magnets, bread-loaf block-type magnets, curved tile magnets, etc. Thus, the depicted arrangement of the various permanent magnets 40 is illustrative of the present teachings and as such, non-limiting.

Also within the scope of the present disclosure, the rotor 12R of FIG. 1 may include a polymer primer/adhesive layer 50 that is disposed between the reinforcement blocks 30 and the surrounding electrical steel or other core material of the rotor lam 120, and/or between the reinforcement blocks 30 and the optional permanent magnets 40 in the FIG. 2B configuration. The polymer primer/adhesive layer 50 is constructed of an epoxy or other application-suitable polymer material, various examples of which are set forth below. In terms of its thickness, the polymer primer/adhesive layer 50 may have a bond line thickness ($T_{BL}$) (see FIG. 2C) of less than about 1 mm. An exemplary lower limit of about 0.01 mm may be envisioned, with a thickness range of about 0.05 mm to about 0.2 mm being possible in a representative embodiment.

As contemplated herein, within the stated exemplary ranges a relatively thick application of the polymer primer/adhesive layer 50 may be used when the polymer primer/adhesive layer 50 is employed as a primer, i.e., to enhance bonding strength between the reinforcement block(s) 30 and surfaces of the rotor lams 120 defining the rotor openings 120-O within which the reinforcement blocks 30 are disposed. When used at other locations, such as between one of the permanent magnets 40 and the core material of the rotor lams 120 as shown in FIG. 2B, the material of the polymer primer/adhesive layer 50 acts as a primary adhesive.

Referring briefly to FIG. 2C, the bond line thickness ($T_{BL}$) of the polymer primer/adhesive layer 50 is defined between interfacing axial surfaces 130 and 220 of the respective reinforcement blocks 30 and rotor lams 120. The actual bond line thickness ($T_{BL}$) may be determined based on the materials of construction of the rotor lams 120, the polymer primer/adhesive layer 50, and the reinforcement blocks 30, as well as the intended end use of the rotor 12R. In general, the bond line thickness ($T_{BL}$) may be between about 0.1 mm and about 1 mm for optimal performance. The material thickness is dictated by the size of a small gap 34 between the interfacing surfaces 130 and 220, with the materials of the polymer primer/adhesive layer 50 applied, drawn through, or otherwise provided within the gaps 34 as described below.

MATERIAL PROPERTIES: in the various disclosed embodiments, and as noted above, the reinforcement blocks 30 may be constructed as solid blocks of a non-magnetic, electrically non-conductive, non-metallic material such as ceramic, or as reinforced polymer material. The reinforcement blocks 30 may have a relatively high modulus of elasticity, for instance in excess of about 10 Gpa, and with a high tensile strength in excess of about 50 MPa. Suitable materials will also have a coefficient of linear thermal expansion approximating that of electrical steel, e.g., about 10-20 ppm/° C. or more. The reinforcement blocks 30 in certain embodiments are formed from a polymer molding compound, e.g., an epoxy or other polymer resin containing a predetermined volume of reinforcing particles and/or fibers such as fiberglass or carbon, of the type commonly used in injection molding, compression molding, and transfer molding processes. Other constructions may include phenolic molding compounds or continuous fiber composites, generally with constituent reinforcement materials making up about 30-40% of the volume of the formed reinforcement block 30.

With respect to the polymer primer/adhesive layer 50, the materials for construction are used to transfer mechanical stress from the rotor lams 120 to the reinforcement blocks 30 and, if used, to the permanent magnets 40 contained within the rotor lams 120. Suitable examples of polymeric materials usable for this purpose include, without limitation, mixtures of epoxy, acrylate, polyurethane, polyimide, and/or bismaleimide, or possibly other materials providing sufficiently high adhesion strength to adjacent substrates.

Relative to the polymer materials used to construct some embodiments of the reinforcement blocks 30 as described above, the materials of construction of the polymer primer/adhesive layer 50 may have a relatively low modulus of elasticity, e.g., less than 3 GPa, or less than about 1 Gpa in different embodiments, with a similarly high tensile strength of about 50 MPa or more. The lower modulus of elasticity of the polymer primer/adhesive layer 50 in the disclosed ranges may help to alleviate stress between the different materials of construction, e.g., due to differential thermal expansion and other factors or effects.

By way of example and not limitation, the modulus of elasticity of the reinforcement blocks 30 may be at least three times greater than a corresponding modulus of elasticity of the polymer primer/adhesive layer 50. The polymer primer/adhesive layer 50 is thus made more compliant that the materials of the reinforcement blocks 30, and is also provided with a relatively high elongation-to-failure. As appreciated by those of ordinary skill in the art, elongation-to-failure is a measure of a material's ductility, i.e., of the amount of strain a given material is able to experience before failing under tensile testing loads.

Additionally, the coefficient of linear thermal expansion or CLTE of the polymer primer/adhesive layer 50 may be near that of the electrical steel or other core materials used to construct the rotor lams 120, e.g., about 10-20 ppm/° C. as noted above, or greater than about 40 ppm/° C. in other embodiments. With respect to the relative terms "reinforce" and "non-reinforced" as employed herein, the materials of the reinforcement blocks 30 as well as those of the polymer primer/adhesive layer 50 may include some amount of reinforcing materials, with those of the reinforcement blocks 30 being significantly higher than those that may be present in the polymer primer/adhesive layer 50.

In a possible embodiment, at least 30% of the volume of an optional polymer material used to construct the reinforcement blocks 30 may be made up of fibers and/or suspended particles of the types described hereinabove. Alternatively as noted above, some or all of the reinforcement blocks 30 may be constructed from a solid monolithic block of an application-suitable non-polymeric material, e.g., ceramic. In contrast, less than about 10% of the volume of the polymer primer/adhesive layer 50 may be made up of such reinforcement fibers and/or suspended particles, and thus as a matter of degree, the polymer primer/adhesive 50 is non-reinforced relative to the reinforcement blocks 30.

Figure 3:
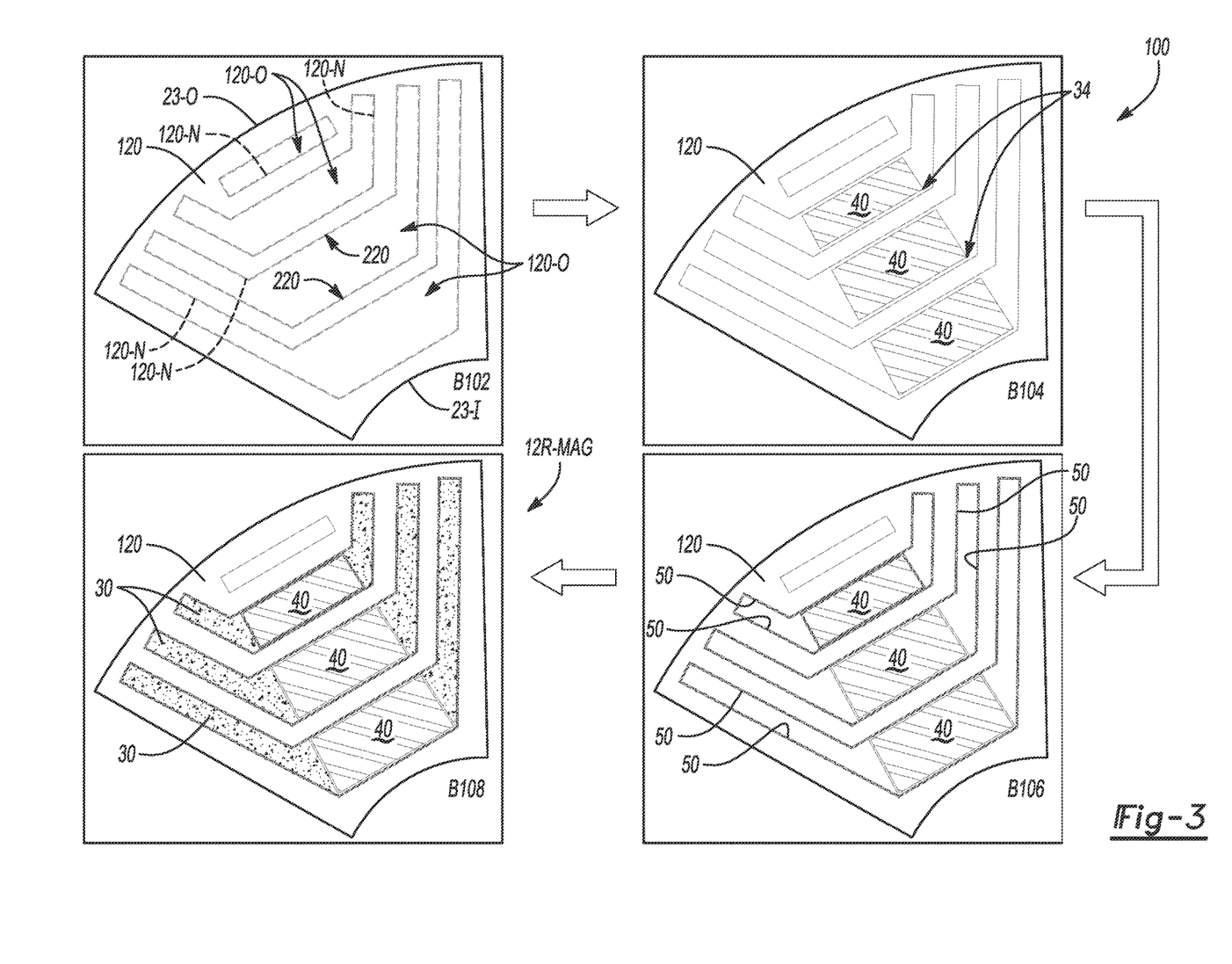
FIGS. 3 and 4 are schematic flow diagrams illustrating methods of forming the rotor shown in FIGS. 2A and 2B.

Manufacturing of the above-described rotor 12R of FIG. 1 will now be described with reference to the remaining Figures. Turning first to FIG. 3, a method 100 of forming the above-described adhesive-reinforced rotor 12R of FIG. 1 commences at process block B102 with manufacturing of an application-sufficient number of the rotor lams 120, with a portion of one such rotor lam 120 depicted in FIG. 3. As appreciated in the art, block B102 may entail punching or stamping individual or stacked blanks of electrical steel or another magnetic core material. The rotor lams 120, which form thin layers instead of a single homogenous stack to help reduce eddy current losses, are then stacked one on top of the other with the assistance of a fixture (not shown) to form a cylindrical rotor stack in accordance with well-established manufacturing processes. The rotor lams 120 may be stacked loosely, or the rotor lams 120 may be bonded and/or welded together into a resulting stack depending on the application.

The method 100 proceeds to optional block B104 after the rotor laminations 120 or a stack thereof is manufactured or otherwise provided in block B102. Block B104 may entail inserting permanent magnets 40 into at least some/one or more of the defined rotor openings 120-O. As shown, a small perimeter gap 34 exists between the reinforcement blocks 30, the permanent magnets 40, and the axial surfaces 220 defining the rotor opening 120-O. Such gaps 34 facilitate insertion of the reinforcement blocks 30 and optional permanent magnets 40, and also provide space for applying the disclosed polymer primer/adhesive layer 50. The method 100 proceeds to block B106 once the optional permanent magnets 40 have been inserted into the rotor openings 120-O.

Block B106 of method 100 may include coating the axial surfaces 220 of the rotor lam 120 with the above-described non-reinforced polymer material to a predetermined bond line thickness ($T_{BL}$) as described above, with the bond line thickness ($T_{BL}$) depicted in FIG. 2C. In a possible approach, block B106 may be performed by flooding the rotor 12R with the polymer materials of the polymer primer/adhesive layer 50, and by thereafter removing the excess materials via gravity, capillary action, vacuum infiltration, forced air, mechanical rotation, and/or vibration. The polymer materials used in constructing the polymer primer/adhesive layer 50 should have a sufficiently low viscosity to allow the various gaps 34 of FIG. 2C to be filled. However, in the event higher viscosity materials are employed, block B106 may include applying a positive pressure to gently urge the materials into the gaps 34.

Alternatively, block B106 may be performed using a fluidized bed coating process. As appreciated in the art, such a process subjects the formed rotor stack of rotor lams 120, with or without inclusion of the permanent magnets 40, to a radiant and/or conductive heat source before submerging the heated rotor lams 120 in a vibrating bed of the non-reinforced polymer materials when the materials are in particle form. Air may be forced into the bed, with air pressure and mechanical vibration together causing the particles to adhere to exposed axial surfaces 220 of the rotor lams 120. The resulting coating thickness using such a fluidized bed coating process is generally proportional to the elapsed time and number of dips of the rotor stack into the fluidized bed.

Within the scope of the method 100, the polymer primer/adhesive layer 50 may be partially cured in a process referred to as "b-staging" before proceeding to block B108. The increased viscosity and cross-linking provided by b-staging may help prevent non-reinforced materials of the polymer primer/adhesive layer 50 from being washed away. Suitable curing processes include ultraviolet curing, optical curing, e.g., using a xenon lamp, and/or infrared curing. Such exemplary approaches could be used as non-thermal methods to partially cure the materials of the primer/adhesive layer 50, such as by inserting a heat/light wand (not shown) into the rotor openings 120-O.

The reinforcement blocks 30 may then be inserted into and thus disposed within the one or more of the rotor openings 120-O of the rotor lams 120 as part of block B108, with or without first coating the reinforcement blocks 30 with the polymer primer/adhesive layer 50, with some of the polymer primer/adhesive layer 50 contacting and coating surfaces of the reinforcement blocks 30. In some embodiments, the reinforcement blocks 30 may be pre-formed in a separate process and thereafter inserted into the rotor openings 120-O around the installed permanent magnets 40. Such a process, which may require additional steps in relation to molding the reinforcement blocks 30 into the rotor openings 120-O directly, has the advantage of separating adhesive requirements from bulk structural requirements, thereby allowing for improved optimization. Alternatively, the reinforcement blocks 30 may be over-molded into the rotor opening 120-O around the installed permanent magnets 40.

Figure 4:
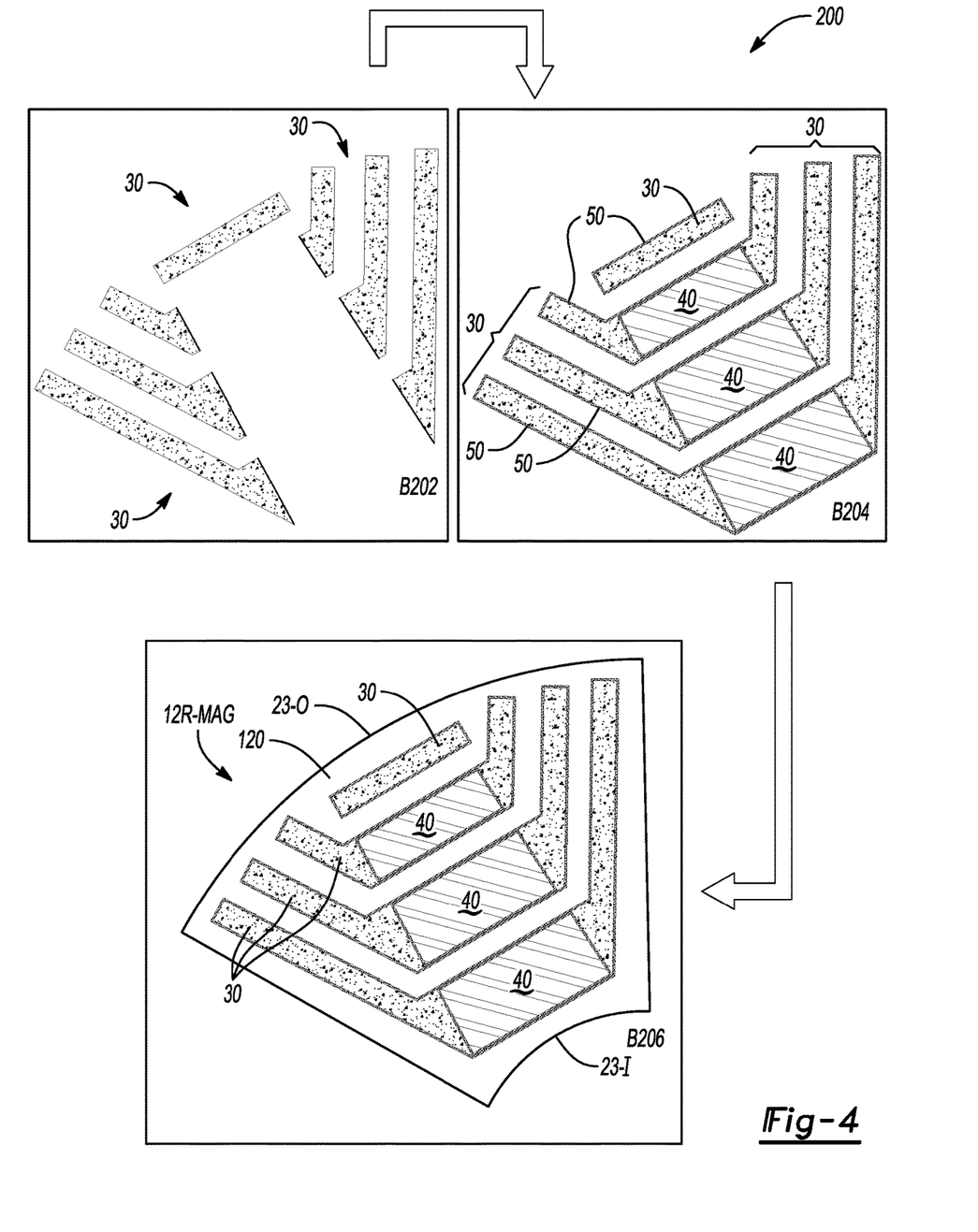

Referring to FIG. 4, an alternative method 200 of forming the adhesive-reinforced rotor 12R of FIG. 1 commences at block B202 by molding or pre-forming the reinforcement blocks 30 outside of the footprint of the rotor lams 120. Molding of polymers into semi-solid or solid blocks of material may include the use of injection molding processes in which the materials are applied to sacrificial or reusable molds having the requisite shape for insertion into the rotor openings 120-O, or other processes resulting in formation of such reinforcement blocks 30. Construction of solid ceramic or other suitable reinforcement blocks 30 of a solid construction may be likewise pre-formed outside of the rotor lams 120.

At block B204, the formed reinforcement blocks 30 and the permanent magnets 40, if used, are coated with the polymer materials of the polymer primer/adhesive layer 50. A variety of techniques may be used to coat exposed surfaces of the reinforcement blocks 30 and permanent magnets 40, such as but not limited to brushing, rolling, and/or spraying the polymer materials onto the exposed surfaces.

Thereafter at block B206, the now-coated and pre-formed reinforcement blocks 30 and possibly the optional permanent magnets 40 are carefully inserted into designated rotor openings 120-O, with the rotor openings 120-O previously created at block B102 (see FIG. 3). Thus, b-staging may be used as part of the method 200 to aid in the insertion of the reinforcement blocks 30 and the permanent magnets 40.

In order to ensure that the gaps 34 between the reinforcement blocks 30 and the permanent magnets 40 and/or the rotor lams 120 are sufficiently filled by the polymer materials of the polymer primer/adhesive layer 50, the polymer materials may be configured in some embodiments to increase in volume during the curing process. This effect could be accomplished by the introduction of a predetermined volume of foaming agents into the non-reinforced polymer materials. For example, the foaming agents could be configured to release a controlled amount of carbon dioxide, nitrogen, or another inert gas during the curing process. Doing so would result in a gaseous expansion of the non-reinforced polymer materials to effectively create small voids or gas bubbles in the polymer primer/adhesive layers 50. The collective void volume provided by such voids, if carefully controlled and regulated to less than 5% by volume of the non-reinforced polymer material, e.g., between 0.5% and 5%, should not significantly affect the resulting adhesive strength.

Methods 100 and 200 of respective FIGS. 3 and 4 may optionally include the use of nanoscale-level surface treatments for further optimizing adhesion and retention of the various construction layers, i.e., the polymer primer/adhesive layer 50, the reinforcement blocks 30, the rotor lams 120, and the optional permanent magnets 40. By way of an example, a thin nucleation layer 120-N such as aluminum oxide ($Al_2O_3$) may be used to coat the axially-extending inner surfaces 120-O of the rotor lams 120, with a phosphate-based or silane-based coating being usable in different embodiments. The term "thin" as used in this context is on the nano scale, for instance less than about 20 nm, e.g., 5 nm to 20 nm, with the smaller end of the scale providing optimal benefits. For the polymer materials used in the composition of the polymer primer/adhesive layer 50 and in some embodiments of the reinforcement blocks 30, processes such as fluorination, silane-based polymers, or under-curing may be used.

Figure 5A:
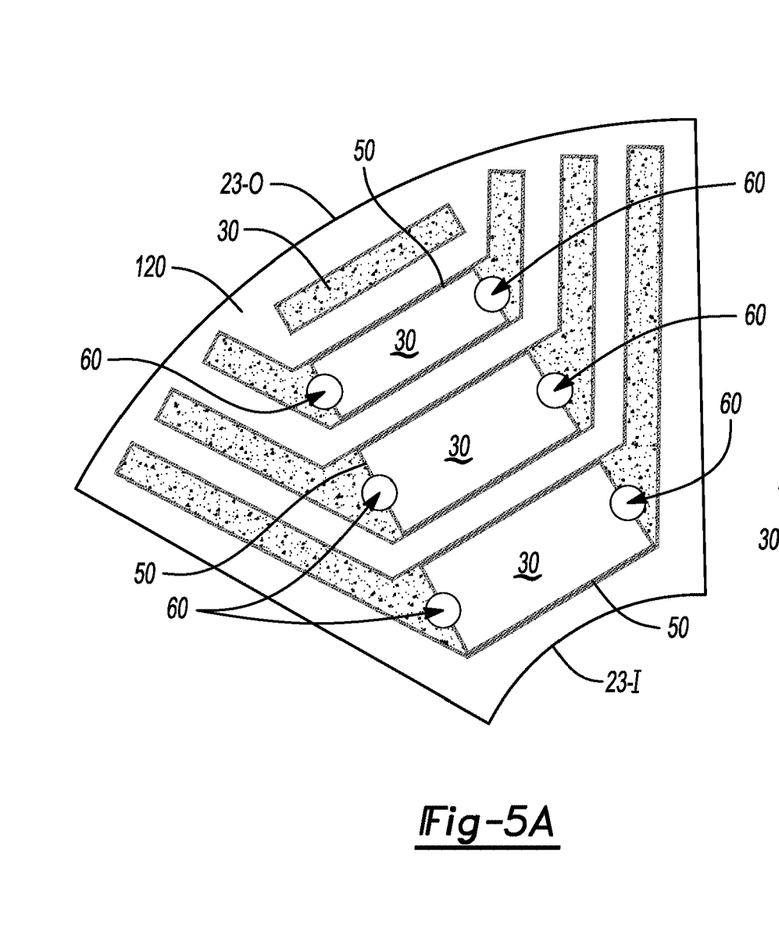
FIGS. 5A and 5B are schematic plan view illustrations of a magnetic pole portion of an alternative rotor usable as part of the electric machine of FIG. 1, with the alternative rotor defining a plurality of coolant channels therein.
Figure 5B:
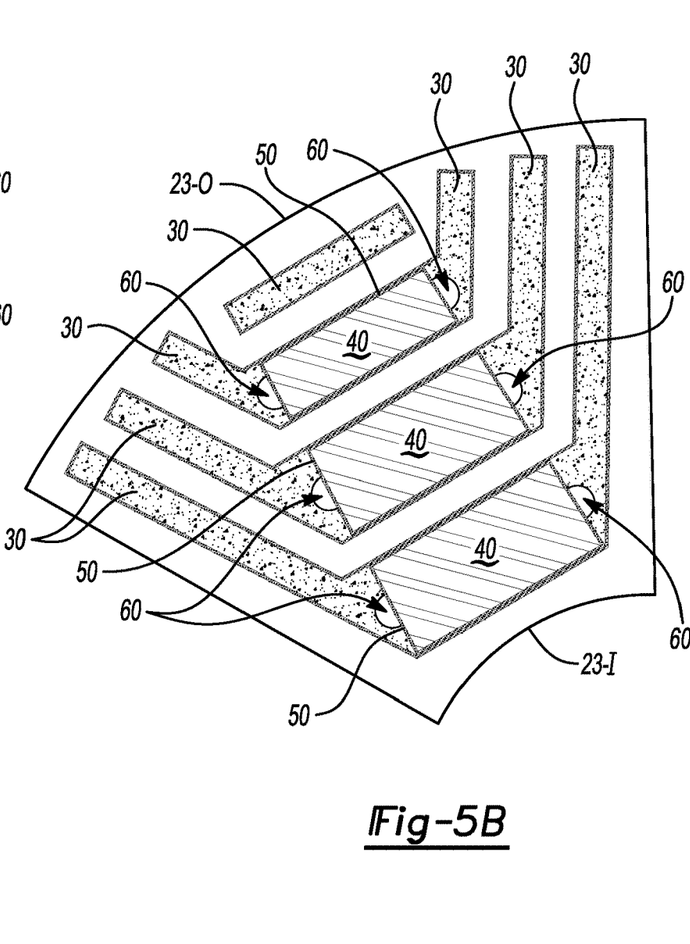

Referring briefly to FIGS. 5A and 5B, in the various embodiments set forth above the reinforcement blocks 30 may optionally define one or more coolant channels 60. As will be appreciated, an application-suitable electrical coolant (not shown) could be circulated via a coolant system (not shown) through the provided coolant channels 60 to help regulate the temperature of the rotor 12R of FIG. 1. In the embodiment of FIG. 5A, for instance, the coolant channels 60 may be present at one or more locations within at least some of the rotor openings 120-O, and/or adjacent to the permanent magnets 40 in the non-limiting FIG. 5B embodiment.

The coolant channels 60 of FIGS. 5A and 5B could be formed in various manners, including by molding the shape of the coolant channels 60 into the reinforcement blocks 30 during formation of the latter. Such a process may be aided by sacrificial materials which are then removed after curing. For larger rotor openings 120-O, correspondingly larger reinforcement blocks 30 could be formed in multiple sections (see FIG. 5A), each with a simpler geometry, with the sections then bonded together, e.g., using the same non-reinforced polymer materials of the polymer primer/adhesive layer 50 or another suitable material.

Figure 6:
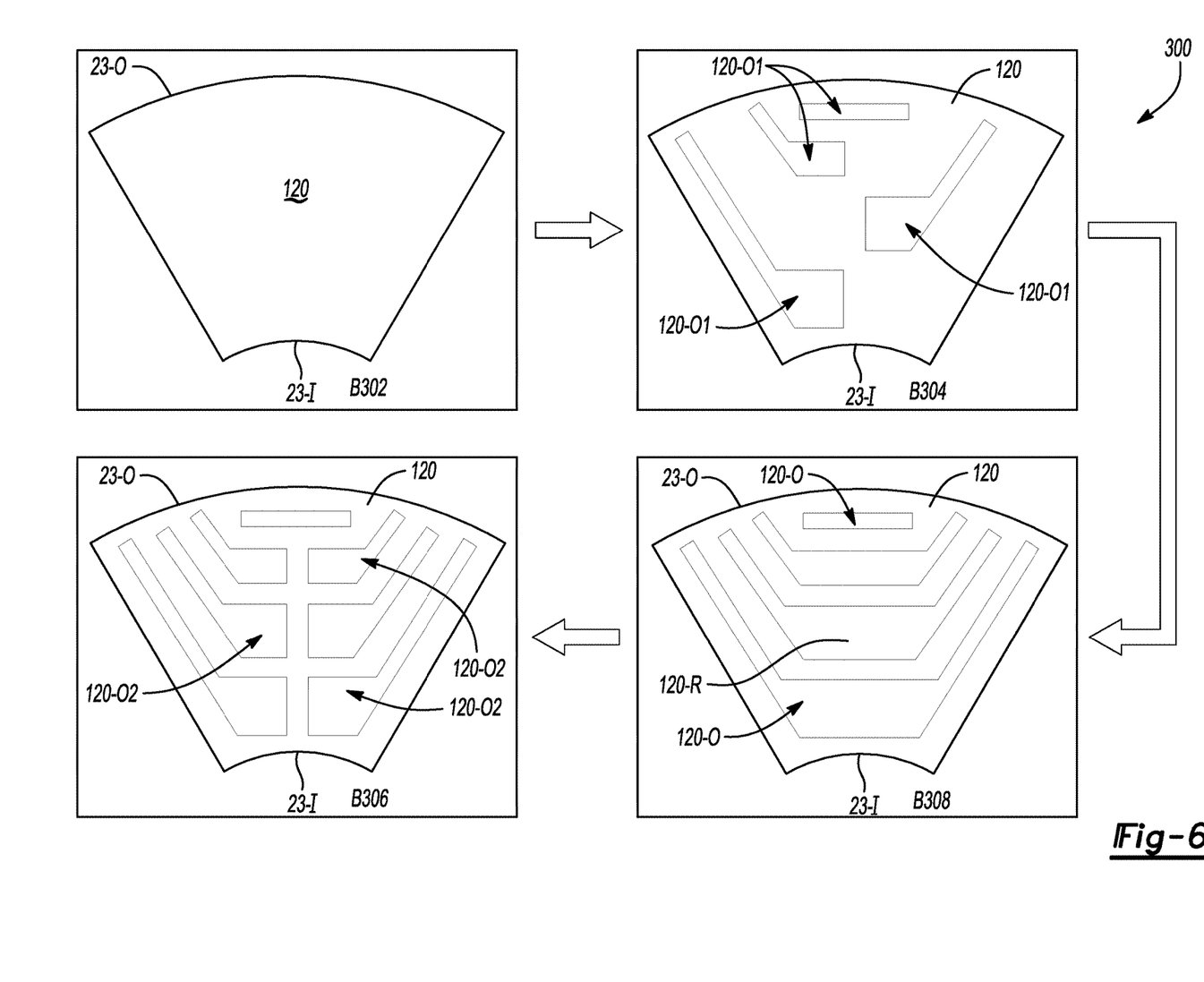
FIG. 6 is a schematic flow diagram illustrating an example method of forming a rotor in accordance with the present disclosure.

FIG. 6 depicts another method 300 that may facilitate formation of the individual rotor lams 120 shown in FIGS. 2A-5B. Due to the cantilevered nature of the flux paths internal to the rotor lams 120, a progressive stamping process may be needed to produce the rotor lams 120 of the depicted configuration with minimal sheet warpage. Commencing at block B302, method 300 may include stamping or punching the rotor lams 120 without yet forming the rotor openings 120-O. Thus, the rotor lams 120 are initially constructed as a solid continuous annulus.

The method 300 proceeds to block B304 once an application-sufficient number of such rotor lams 120 have been formed in this manner. At block B304, the method 300 includes stamping or punching a first set of the rotor openings 120-O1 through each of the rotor lams 120 constructed in block B302. Similarly at block B306, a second set of rotor openings 120-O2 may be formed symmetrically with respect to the first set of rotor openings 120-O1 formed in block B304, such that a radially-extending magnetic rib portion 120-R of each of the rotor lams 120 symmetrically partitions the respective first and second sets of rotor openings 120-O1 and 120-O2. Such a rib portion 120-R is then subsequently cut away and removed at block B308 to form the finished rotor lams 120 described above, e.g., as shown in block B102 of FIG. 3.

Figure 7:
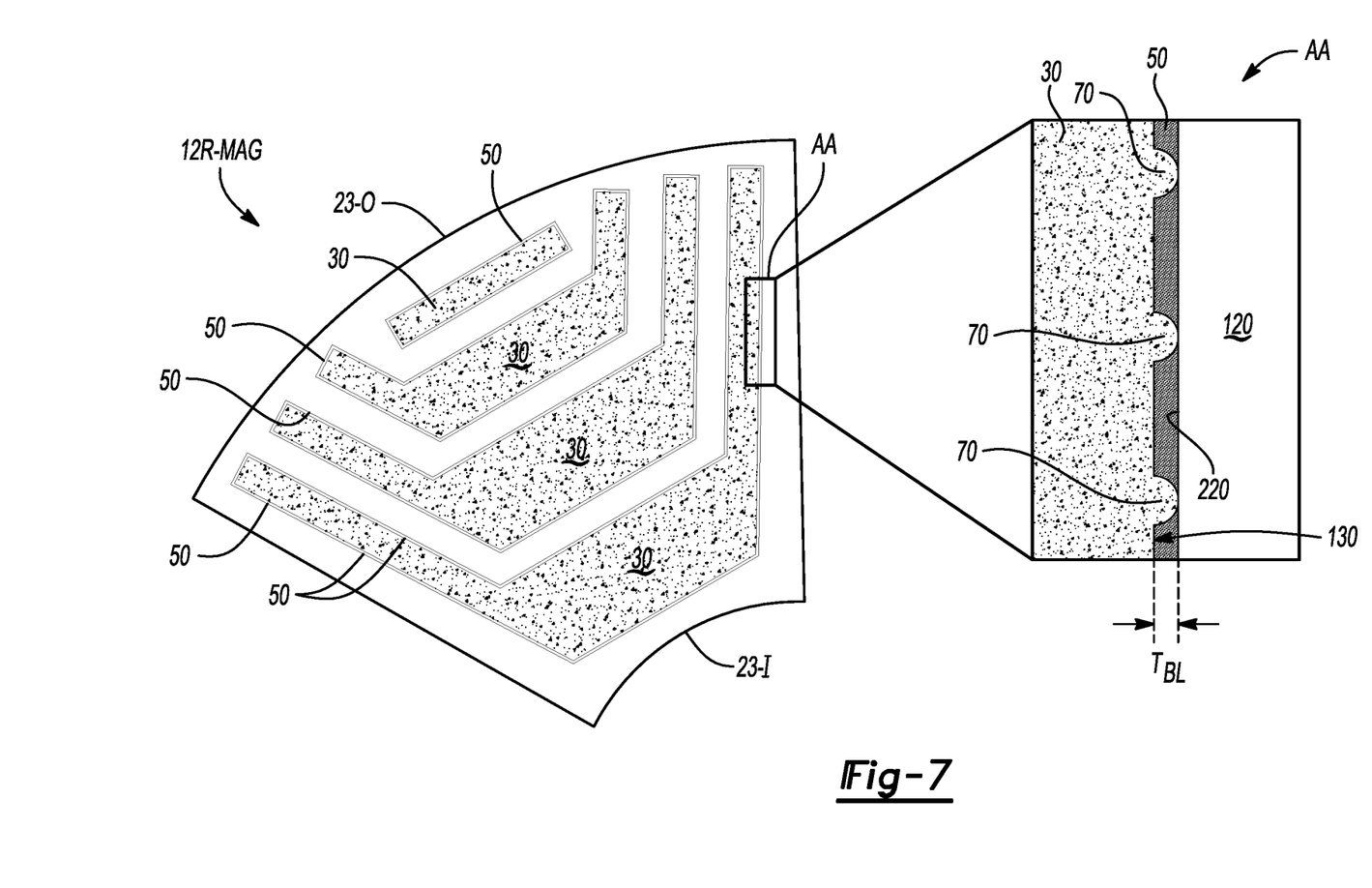
FIG. 7 is a schematic illustration of an optional surface profile usable as part of the various methods and rotor constructions set forth herein.

Referring to FIG. 7, the various methods 100, 200, and 300 described above may include forming or providing multiple protuberances 70, e.g., raised bumps, bosses, and/or other regular or irregular surface projections or asperities. Such protuberances 70, shown in more detail in inset area AA, may be formed on or molded into the outer surfaces 130 of the reinforcement blocks 30, with the outer surface 130 in this instance being the particular external surface of the reinforcement blocks 30 facing the surfaces 220 of the surrounding rotor lams 120 when the reinforcement block 30 has been inserted into the rotor openings 120-O.

A height of the protuberances 70 may not exceed the bond line thickness ($T_{BL}$), and is ideally slightly shorter, with "slightly" meaning about 95-99% of the bond line thickness ($T_{BL}$) in an exemplary embodiment. Thus, in order to facilitate a sliding engagement of the reinforcement blocks 30 into the rotor openings 120-O, the protuberances 70 could be formed when molding the reinforcement blocks 30 to be a bit shorter than the bond line thickness ($T_{BL}$), which in turn will provide clearance on the fit.

The foregoing disclosure thus enables an adhesive-reinforced construction of the rotor 12R shown in the non-limiting application of FIG. 1 from a stack of the rotor lams 120, with the rotor 12R reinforced via the reinforcement blocks 30 and the polymer primer/adhesive layer 50 configured as described herein. Optional configurations of the rotor 12R may incorporate the permanent magnets 40 of FIGS. 2B-4 and 5B, and/or the coolant channels 60 shown in FIGS. 5A and 5B, within the structure of the reinforcement blocks 30, with the reinforcement blocks 30 possibly including the protuberances 70 of FIG. 7. The use of structural polymers, ceramics, and/or other high-stiffness and low electrical conductivity materials may be used for added reinforcement, with the possible application of a nanoscale-level nucleation layer to the rotor lams 120 to further enhance bonding of the polymer primer/adhesive layer 50 to in the surfaces 220 of the rotor lams 120.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. An adhesive-reinforced rotor for a rotary electric machine, comprising:
   a stack of rotor lamination layers constructed of a magnetic core material, each of the rotor lamination layers having inner axial surfaces collectively defining a set of rotor openings through the magnetic core material;

one or more reinforcement blocks constructed of a non-magnetic, non-metallic, and electrically non-conductive material, wherein the one or more reinforcement blocks are disposed within a respective one of the rotor openings; and a polymer primer/adhesive layer having a bond line thickness of less than 1 mm, wherein the polymer primer/adhesive layer is disposed between the one or more reinforcement blocks and the inner axial surfaces of the rotor lamination layers, the polymer primer/adhesive layer and the reinforcement blocks have a tensile strength of at least 50 MPa, and a modulus of elasticity of the reinforcement blocks is at least three times greater than a modulus of elasticity of the primer/adhesive layer.

2. The adhesive-reinforced rotor of claim 1, wherein the modulus of elasticity of the reinforcement blocks is at least 10 GPa, and the modulus of elasticity of the polymer primer/adhesive layer is less than 3 GPa.

3. The adhesive-reinforced rotor of claim 1, wherein at least 30% of a volume of the reinforcement blocks is made up of reinforcement fibers and/or particles, and wherein less than 10% of a volume of the polymer primer/adhesive layer is made up of the reinforcement fibers and/or particles.

4. The adhesive-reinforced rotor of claim 1, wherein the reinforcement blocks are constructed of a ceramic material.

5. The adhesive-reinforced rotor of claim 1, wherein the polymer primer/adhesive layer has a bond line thickness of between 0.05 mm and 0.2 mm, a modulus of elasticity of less than 1 GPa, and a coefficient of linear expansion of at least 40 ppm/° C.

6. The adhesive-reinforced rotor of claim 1, further comprising a plurality of permanent magnets, each respective one of which is disposed within a corresponding one of the rotor openings and bonded to the rotor lamination layers by the polymer primer/adhesive layer.

7. The adhesive-reinforced rotor of claim 1, wherein at least one of the reinforcement blocks defines one or more coolant channels therethrough.

8. The adhesive-reinforced rotor of claim 1, wherein the primer/adhesive layer includes a void volume of between 0.5% and 5% of a total volume of the primer/adhesive layer.

9. The adhesive-reinforced rotor of claim 1, wherein at least one of the reinforcement blocks has multiple sections bonded together using the polymer primer/adhesive material.

10. The adhesive-reinforced rotor of claim 1, further comprising a nucleation layer on or along the axially-extending inner surfaces of the rotor lamination layers, wherein the nucleation layer has a thickness of 20 nm or less.

11. The adhesive-reinforced rotor of claim 1, wherein an outer surface of the reinforcement block defines protuberances having a height of between 95% and 99% of the bond line thickness.

12. A method of constructing an adhesive-reinforced rotor for a rotary electric machine, the method comprising:
forming a stack of rotor lamination layers from a magnetic core material, the rotor lamination layers including axial inner surfaces that collectively define a set of rotor openings through the rotor lamination layers;
coating the axial inner surfaces of the rotor lamination layers with a polymer primer/adhesive layer to a predetermined bond line thickness of less than 1 mm;
partially curing or b-staging the polymer primer/adhesive layer;
inserting reinforcement blocks constructed of a ceramic material or a reinforced polymer composite material into one or more of the rotor openings of the rotor lamination layers after partially curing or b-staging the polymer primer/adhesive material, wherein a modulus of elasticity of the reinforcement blocks is at least three times greater than a modulus of elasticity of the polymer primer/adhesive material; and
bonding the reinforcement blocks to the rotor lamination layers around axial inner surfaces using the polymer primer/adhesive material to thereby reinforce the rotor.

13. The method of claim 12, wherein coating the axial inner surfaces of the rotor lamination layers with the polymer primer/adhesive layer includes flooding the rotor with a non-reinforced polymer material and thereafter removing an excess thereof using gravity, capillary action, vacuum infiltration, forced air, mechanical rotation, and/or mechanical vibration.

14. The method of claim 12, further comprising coating the reinforcement blocks with the polymer primer/adhesive layer before inserting the reinforcement blocks into the one or more of the rotor openings of the rotor lamination layers.

15. The method of claim 12, further comprising inserting a permanent magnet into at least some of the rotor openings, wherein inserting the reinforcement blocks includes pre-forming the reinforcement blocks to form pre-formed reinforcement blocks, and thereafter positioning the pre-formed reinforcement blocks adjacent to the permanent magnets within rotor openings.

16. The method of claim 12, further comprising introducing a foaming agent into the polymer primer/adhesive layer during the b-staging to thereby cause a gaseous expansion of the polymer primer/adhesive layer to occur.

17. The method of claim 12, further comprising forming protuberances on an outer surface of the reinforcement block, each of the protuberances extending 90% to 99% of the predetermined bond line thickness.

18. The method of claim 12, further comprising applying a nucleation layer to the axial inner surfaces of the rotor lamination layers to a thickness of less than 20 nm.

19. A rotary electric machine comprising:
a stator;
a rotor having a plurality of rotor lamination layers surrounded by the stator, the rotor lamination layers being formed of electrical steel and having axial inner surfaces collectively defining a set of rotor openings;
one or more reinforcement blocks constructed of a ceramic material or a reinforced polymer composite material and disposed within the rotor openings, wherein a respective outer surface of each of the reinforcement blocks defines multiple protuberances;
a nucleation layer bonded to the axial inner surfaces, constructed of $Al_2O_3$, and having a thickness of less than 20 nm; and
a polymer primer/adhesive layer having a bond line thickness of between 0.05 mm and 0.2 mm, the polymer primer/adhesive layer being constructed of a non-reinforced polymer material and disposed between each respective one of the one or more reinforcement blocks and the rotor lamination layers, wherein:
each of the protuberances extends into the primer/adhesive layer a distance of between 90% and 99% of the bond line thickness;
a modulus of elasticity of the reinforced polymer material is at least 10 GPa, and a modulus of elasticity of the non-reinforced polymer material is less than 1 GPa; and the non-reinforced polymer material and the reinforcement blocks each have a tensile strength of at least 50 MPa and a coefficient of linear expansion of about 10-20 ppm/° C. or more.

20. The rotary electric machine of claim 19, further comprising a set of permanent magnets, wherein each respective one of the permanent magnets is disposed within a respective one of the rotor openings, an outer surface of the permanent magnets is coated with the polymer primer/adhesive layer, and at least some of the reinforcement blocks define one or more coolant channels therethrough in proximity to at least some of the permanent magnets.

* * * * *